United States Patent [19]

Shuttleworth et al.

[11] Patent Number: 5,283,119
[45] Date of Patent: Feb. 1, 1994

[54] PROCESS FOR THE SURFACE TREATMENT OF POLYMERS FOR REINFORCEMENT-TO-RUBBER ADHESION

[75] Inventors: Derek Shuttleworth, Munroe Falls, Ohio; Syed K. Mowdood, Madison, Conn.; Walter H. Waddell, Fairlawn, Ohio; Jimmy L. Richards; Eilert A. Ofstead, both of Cuyahoga Falls, Ohio; Jerry L. Brenner, Copley, Ohio

[73] Assignee: The Goodyear Tire & Rubber Company, Akron, Ohio

[21] Appl. No.: 726,436

[22] Filed: Aug. 13, 1991

Related U.S. Application Data

[62] Division of Ser. No. 501,564, Mar. 30, 1990, Pat. No. 5,053,246.

[51] Int. Cl.[5] .............................................. D02G 3/00
[52] U.S. Cl. .................................... 428/375; 428/378; 428/394; 428/395
[58] Field of Search ............... 428/375, 378, 394, 395; 156/110.1

[56] References Cited

U.S. PATENT DOCUMENTS

| | | | |
|---|---|---|---|
| 4,130,545 | 12/1978 | Calundann | 524/604 |
| 4,184,996 | 1/1980 | Calundann | 524/605 |
| 4,328,324 | 5/1982 | Kock et al. | 525/423 |
| 4,469,748 | 9/1984 | Sharma | 428/378 |
| 4,680,228 | 7/1987 | Sharma | 428/378 |
| 5,139,873 | 8/1992 | Rebouillat | 428/375 |

Primary Examiner—Patrick J. Ryan
Assistant Examiner—N. Edwards
Attorney, Agent, or Firm—David E. Wheeler

[57] ABSTRACT

This invention is directed to treating the surfaces of rubber-reinforcing materials with a gas plasma of $O_2$ and $CF_4$ to activate the surfaces to make them more receptive to adhesives. Optionally the surfaces of the reinforcing materials may be exposed to a polymerizing gas plasma such as a thio-carbon to coat the surfaces of the reinforcing material with substances that promote adhesion to rubber. The treated surfaces have been shown to adhere directly to rubber when vulcanized in the normal fashion.

3 Claims, 3 Drawing Sheets

PROCESS FOR THE SURFACE TREATMENT OF POLYMERS FOR REINFORCEMENT-TO-RUBBER ADHESION

This is a divisional of application Ser. No. 07/501,564, filed on Mar. 30, 1990, now U.S. Pat. No. 5,053,246.

FIELD OF THE INVENTION

This invention relates to the treatment of a polymeric reinforcement for the purpose of promoting adhesion to elastomers. The invention also relates to providing an adhering surface on reinforcement material used as a reinforcing agent in rubber in a pneumatic tire, and pneumatic tires using such treated reinforcement.

BACKGROUND

Rubber is typically reinforced with various embodiments of textile, glass or steel fibers to provide basic strength, shape, stability, and resistance to bruises, fatigue, and heat. These fibers may be twisted into plies and cabled into cords. Rubber tires of various construction as well as various industrial products such as belts, hoses, seals, bumpers, mountings, and diaphragms can be prepared using such cords.

Although cords of various composition (including metals) can be prepared and used to reinforce rubber, textile cords are used in many instances to reduce the weight of the article, for ease of manufacture, and for performance. Unfortunately, textile fiber-to-rubber adhesion tends to be poor and may be degraded during use, causing uneven wear and a shortened life for the article.

Various methods have been utilized in the past to promote adhesion and to reduce such degradation. One such method is the application of various Resorcinol-Formaldehyde-Latex (RFL) coatings to the cord surface. Treating the cord in preparation for RFL dipping treatment, and the RFL treatment itself, involve a complicated sequence of time consuming and consequently expensive steps.

It continuously remains desirable to improve adhesion of a textile cord to rubber and to reduce the number of process steps required and the cost of providing such adhesion.

SUMMARY OF THE INVENTION

The invention relates to a method of preparing a polymer surface for chemical bonding. The method comprises disposing a polymer in a plasma chamber containing a mixture of oxygen ($O_2$) and tetrafluoromethane ($CF_4$) at a pressure of about 0.001 to 1 torr, and exposing the surface of the polymer to a plasma generated by electrical energy of about 50 Hz to 2.45 GHz. In a preferred embodiment, the polymer is in the form of a filament, tow, cord, woven fabric or fiber. The plasma treatment removes hydrogen bonded species and other weakly bonded species, such as sulfates, carbonates, low molecular weight polymer, and processing aids, etc. from chemically reactive sites on the polymer surface, making those sites available for chemical bonding. The chemically reactive sites may then be exposed to other species, such as an RFL adhesive.

The invention also relates to a method of preparing the surface of a polymer for direct bonding to rubber. The method comprises disposing the polymer in a plasma chamber containing a polymerizing gas and exposing the polymer surface to a plasma generated by electrical energy of about 50 Hz to 2.45 GHz. In a preferred embodiment, the polymer surface will first be prepared for the polymerizing gas by exposing the polymer to an incorporating gas, a non-incorporating gas, or an inert gas in a plasma chamber. It has been found that when such a polymerizing plasma treatment is used on reinforcing materials intended for use in tires, that the strength of adhesion of the reinforcing member to rubber is increased over the adhesion obtained by RFL dipped reinforcing members.

Also provided are reinforcing cords made by the methods of the invention.

Also provided are pneumatic tires constructed using reinforcing members prepared by the methods of the invention.

DEFINITIONS

"plasma substrate" refers to an article that is exposed to a plasma in a plasma chamber.

"incorporating gases" refers to plasma gases whose constituents are incorporated in a plasma substrate molecular structure.

"non-incorporating gases" refers to plasma gases that have constituents that do not bond to a plasma substrate.

"polymerizing gases" refers to plasma gases (typically carbon containing) that have constituents that bond to one another to form a polymer network on a plasma substrate.

DETAILED DESCRIPTION OF THE INVENTION

Figure 1:
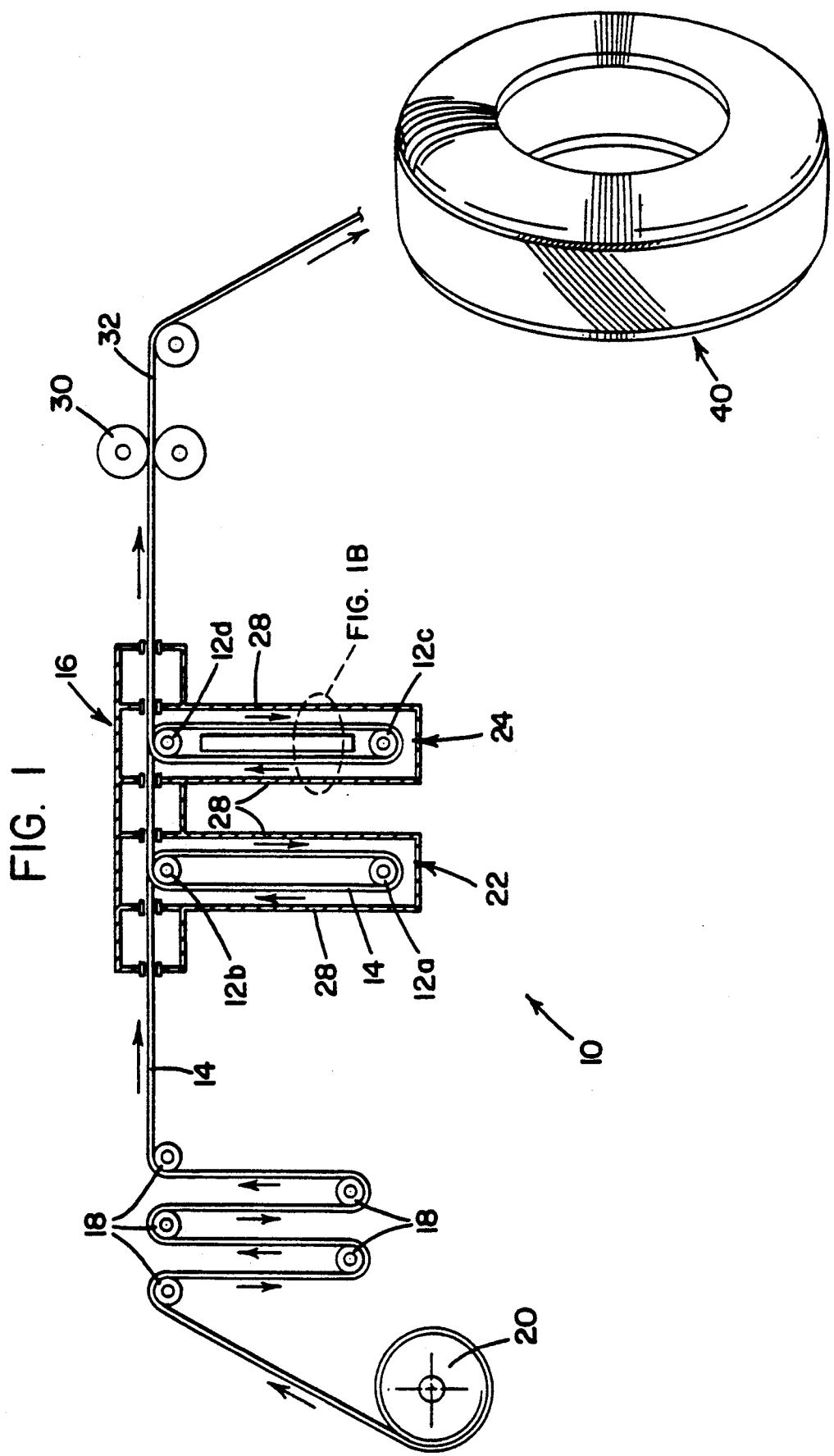
FIG. 1 illustrates an apparatus of the invention.

In accordance with the present invention a reinforcing polymer that is in a form (e.g. a filament, tow, woven fabric, cord or fiber) suitable for reinforcing an elastomeric polymer (e.g. rubber) and plastics (which may contain functional groups such as epoxy and cyano) is treated with a plasma to prepare the surface of the polymer for bonding to the elastomer. In the illustrated embodiment, the reinforcing material is used in the construction of a tire.

Any rubber reinforcing material known in the art can be subjected to the plasma treatments of the invention. Examples of such materials are natural materials such as cellulose and treated cellulose such as rayon. Synthetic reinforcement materials made from, for example, polyurea, polymeric liquid crystals and thermoplastics can also be used. Examples of such materials are polyamides (e.g. various nylons), polyaramides (e.g. Kevlar ® available from I. E. DuPont de Nemours, Co., Inc., Wilmington, Del.), polyesters, polyolefins, polyurethanes, polyimides, polyvinyl alcohol, (PPS) polyphenylene sulfides, and mixtures thereof.

Although the treated reinforcing members of the present invention are intended for use in tires, those skilled in the art will recognize that such reinforcing members can be used in other elastomeric products such as conveyor belts, V-belts, hoses, rubber crawlers and the like.

The plasma used in the method of the invention can be generated using electrical energy in the 50 Hz (ac) to 2.45 GHz (microwaves) range.

The reactive plasma can be suitably formed in a radio-frequency environment. This can be accomplished, for example, by placing the substrate (cord) in a vacuum chamber and using a radio frequency discharge to excite a plasma in oxygen gas at a temperature in the range of about 20°–50° C. The material may be treated in either a static batch or continuous process. By using appropriately sized orifices and differential pumping schemes, continuous transport of the cord through the plasma can be achieved.

The plasma can be generated at a reduced pressure ranging, for example, from 0.001 to 1 torr. Magnetic enhancement of the plasma may be used.

Gases may be incorporating (for example ammonia ($NH_3$), oxygen ($O_2$), or nitrogen ($N_2$), which may include most of the natural non-inert gases); non-incorporating (for example tetrafluoromethane ($CF_4$), hexafluorosulfide ($SF_6$), and the inert gases, but not limited to these species), or polymerizing types.

Polymerizing gases are used with the aim of providing a polymer network which has good adhesion to rubber on the surface of the reinforcing polymer to provide bonding directly to rubber by one or more of the methods described herein. The type of chemical functionality required to achieve this is exemplified by carbon disulfide.

In a first embodiment of the method of the invention, a reinforcing polymer in the form of a reinforcing material is disposed in a plasma chamber containing a mixture of oxygen ($O_2$) and tetrafluoromethane (a non-incorporating plasma) at a pressure of about 0.001 to 1 torr. Although other non-incorporating plasmas have been used in the prior art to treat polymer surfaces, applicant's have found that an $O_2/CF_4$ plasma provides superior results over any specific, previously described plasma.

Examples of additional reinforcing polymers that may be treated in accordance with the invention include polyethers, carbon fibers and other similar reinforcing polymers known in the art.

The $O_2/CF_4$ mixture may comprise 10–90% $O_2$ and 10–90% $CF_4$, preferably 60–90% $O_2$ and 10–40% $CF_4$. In the preferred embodiment, the gas pressure of the mixture will be about 0.1–1 torr.

Figure 1A:
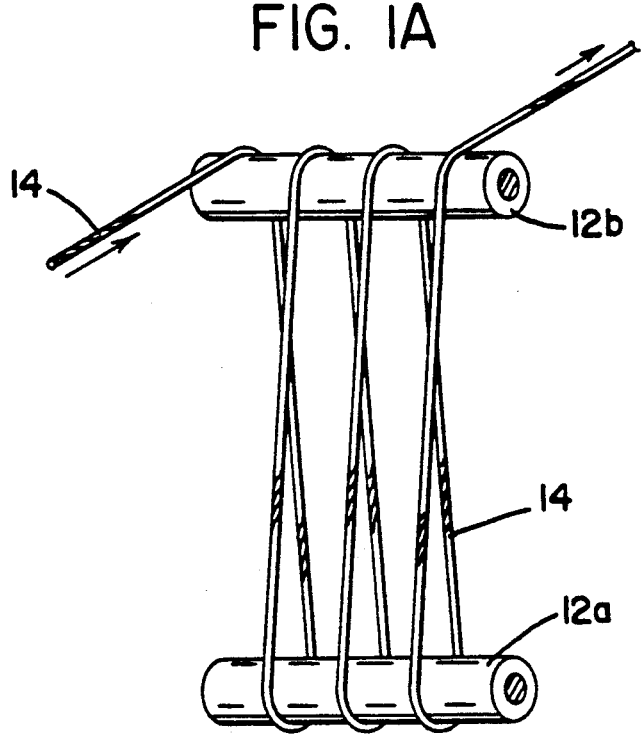
FIG. 1a is a side view of string distribution in the illustrated apparatus.

With reference now to FIG. 1, in the illustrated embodiment of the apparatus 10, the polymer is disposed over a series of spools 12 (when the polymer is in the form of a filament or a cord), or in a tray (when the polymer is in the form of short fibers) in plasma chamber 16. When the polymer is in the form of a filament, cable, cord or tow (collectively string), it is preferred that the string 14 is stretched or tensioned over tension rollers 18 as it is removed from spool 20 to assure maximum surface exposure. After tensioning, string 14 passes into plasma chamber 16 over spools 12. Preferably, string 14 will wrap over each spool 12, 12a (as illustrated in FIG. 1a) several times to increase the residence time of the string in the plasma chamber. In the illustrated embodiment, two separate chambers 22 and 24 are provided so that the string may be treated by two different plasmas in sequence. Those skilled in the art will recognize that other suitable arrangements can be used.

The number of times the string is wrapped around spools 12 and 12a in chamber 22 and spools 12b and 12c in chamber 24 may be used to differ the residence time in each chamber. Different residence times may be desirable when two different plasmas that are used for different purposes (e.g. cleaning then coating) are employed.

The plasma chamber 16 is then exposed to electrical energy in the radio frequency range (13.56 MHz) to create the plasma (an equal number of positively and negatively charged gaseous ionic species). The polymer surface is exposed to the plasma for between about 15 and 200 seconds, preferably about 30–180 seconds.

In the operation of a static chamber, plasma may be generated by pumping the desired gas into the chamber between positively and negatively charged electric plates or electric grids 28 which polarize the gases into positively and negatively charged ions.

Figure 1B:
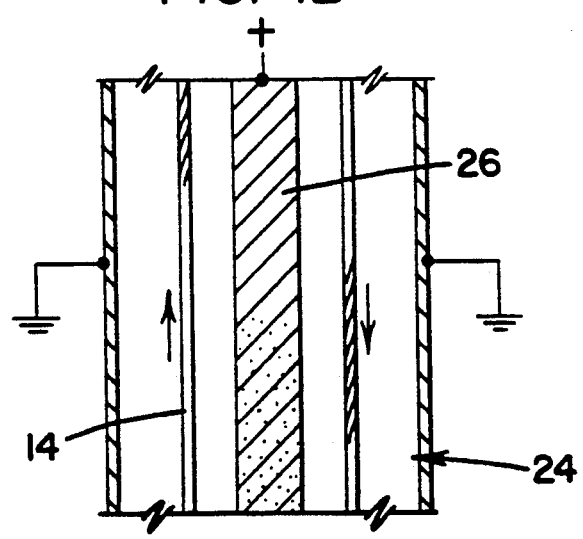
FIG. 1b is an enlargement turned 90° of area B of the apparatus of FIG. 1.

If desired, the effectiveness of the plasma may be enhanced by subjecting the plasma to a magnetic field provided by electromagnet 26 (FIG. 1b) which may be disposed within the plasma chamber.

After string 14 passes through plasma chamber 16 it may be incorporated directly into a rubber matrix, for example by calendering using calendering rolls 30, to form a reinforcing ply 32 in a form which is suitable for use in constructing a tire 40.

It has been found that exposure to the $O_2/CF_4$ plasma cleans (i.e. removes) contaminating species, such as hydrogen bonded materials, lubricating oils, processing residues, and loosely bound or decomposed polymer from the polymer surface, apparently exposing potential chemically reactive sites on the surface of the polymer. It is believed that the plasma treatment also partially crosslinks and dries the polymer surface to enhance adhesion. It has been shown that cleaning the polymer surface in this manner improves the effectiveness of any subsequent dipping procedure (such as dipping in an RFL adhesive).

It is believed that when a conventional dip is used, the strength of the resulting adhesive bond is improved because the plasma increases the wettability of the fiber and introduces polar species such as oxygen onto the surface of the reinforcing polymer to interact strongly with the adhesive. In general, a plasma treated reinforcing polymer of the invention when subjected to a conventional RFL dip has a "to rubber" bond strength about double that of a reinforcing polymer that has been subjected to RFL treatment only, and 25–40% better "to rubber" bond strength than reinforcing polymers that are treated with conventional epoxy/RFL adhesives.

As discussed above, although not as effective, similar results can be obtained using other incorporating or non-incorporating gases such as $O_2$, $NH_3$, $CF_4$, Ar, $N_2O$, and $H_2O$ as an activating step prior to RFL dipping.

In a further embodiment of the invention, by using a polymerizing plasma, species that demonstrate enhanced bonding to an elastomer may be deposited directly onto the polymer surface. In such a procedure, the conditions in the plasma chamber will be substantially as described above except that a polymerizing gas or gas mixture will be used. It has been found that gases such as sulfides, thiols, isocyanates (containing 1–15 aliphatic and/or aromatic carbon atoms) polymerize a material onto the polymer that contains functionalities that are capable of chemical reaction with the components of the elastomer matrix during curing.

In a preferred embodiment, the reinforcing material will first be subjected to the plasma cleaning procedure described above using any of the incorporating or non-incorporating plasma gases described herein or in EP application 0168131 or EP application 0172057, and then provided with a second plasma treatment using one of the polymerizing plasmas described herein.

In an alternative embodiment, because of the reactivity of plasmas, an acceptable treatment may be obtained using a polymerizing plasma treatment only.

Examples of elastomers contemplated for use in conjunction with the reinforcing materials of the invention are natural rubber, styrene butadiene rubber, EPDM (ethylene propylene diene monomer rubber), isoprene rubber, neoprene rubber, butadiene rubber, rubber, butyl rubber, halobutyl rubber, styrene isoprene butadiene rubber and mixtures thereof.

It has been found that reinforcing material that is prepared by depositing polymer species which provide a good bond to an elastomer directly on the reinforcing material greatly improves the adhesive bonding of reinforcing material to the elastomer. Also, since polymer species may be deposited directly on the reinforcing polymer directly from the plasma, time consuming and expensive prior art dipping and drying steps may be avoided.

The choice of the plasma used (e.g. incorporating versus non-incorporating) and the proper sequencing of treatment may enhance the successful application of the invention. In addition, the realization of advantageous properties may be further enhanced by the choice of modifier(s), operating conditions (for example power, frequency, gas flow rate, gas pressure, and residence time on the substrate), and monitoring procedures employed. General parameters for establishing plasma atmospheres are well known to those having skill in the art.

It was observed that gas plasmas significantly improved the ease and quality of processing polymeric reinforcement materials used in the preparation of reinforced rubber articles. Significant observed properties were (a) reduced selectivity relating to the reinforcing polymer used (i.e. it is not necessary to modify the plasma treatment to optimize adhesion to a particular reinforcing polymer as is the practice using RFL adhesives), (b) direct adhesion to rubber (i.e. when a polymerizing plasma is used, the reinforcing polymer can be incorporated directly in rubber without an RFL treatment or an epoxy/RFL treatment), (c) non-selectivity relating to the composition of the rubber compound (i.e. it is not necessary to modify the plasma treatment to optimize adhesion to a particular rubber composition as is the practice using RFL adhesives) and (d) improved aged adhesion.

Figure 2:
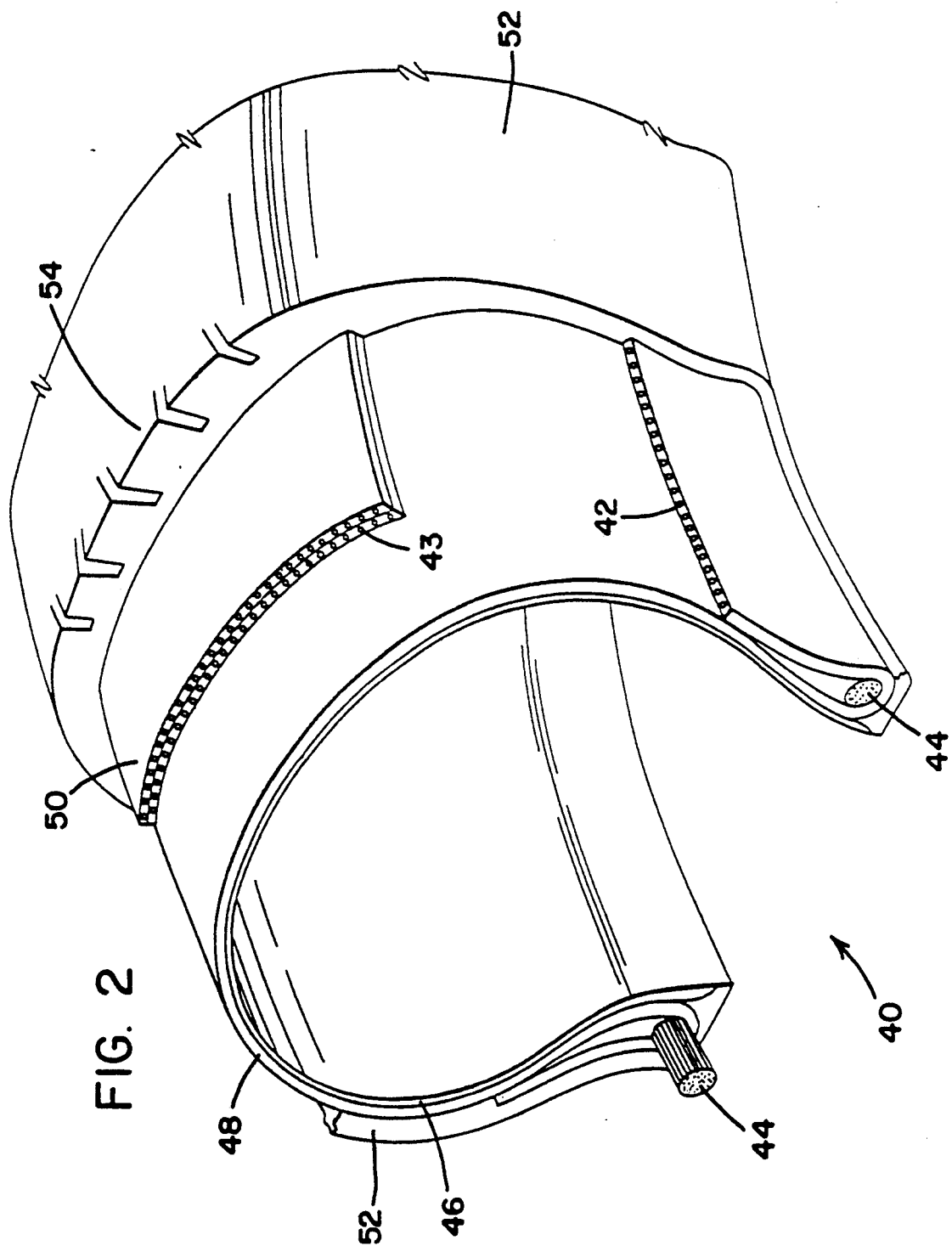
FIG. 2 illustrates a tire made using the reinforcing cord of the invention.

With reference now to FIG. 2, a pneumatic tire 40 made incorporating reinforcing cords 42 and 43 of the invention is illustrated. The tire is made as is conventional in the tire building art with the exception that reinforcing cords that have been treated in a plasma chamber, as described above, instead of conventional RFL dipped reinforcing cords, are used in the construction. The tire includes tire beads 44, carcass plies 48 which are wrapped around beads 44, an optional innerliner 46 disposed inwardly of the carcass plies, optional belts or breakers 50 disposed in a crown area of the tire over the carcass plies, tread 54 disposed in the crown area of the tire over the carcass plies and optional belts or breakers, and sidewalls 52 disposed between the tread 54 and the beads 44.

The tire reinforcements which may be treated using the plasma treatment of the invention include cords, cables, or monofilaments that are used mainly in the carcass plies and belt or breaker plies; and short fibers that may be used in the tread, sidewalls, shoulders, bead area, innerliner, carcass rubber, chafer, toe guard, and belt or breaker area of the tire or a thermoplastic composite bead.

The invention is further described with reference to the following examples.

EXAMPLE 1

This example illustrates the adhesive strength of an Aramid cable after continuous treatment of the cable (the cable used was Flexten ®, which is available from The Goodyear Tire & Rubber Company, Akron, Ohio) by sequential plasmas and testing in high strength natural rubber composites after dipping in a simple RFL formulation and curing. The natural rubber composition used in the examples had a self-Strebler tear value of about 350 N/cm. The experimental cords were first treated with a $CF_4/O_2$ plasma followed by a plasma treatment with one of the gases listed below. The controls for the experiments are: Control 1A, cables that have had a conventional RFL treatment; and Control 1B, cables that have been treated with conventional epoxy/RFL adhesive technology. See "Systems for Tire Cord-Rubber Adhesion" by T. S. Solomon, Rubber Chemistry & Technology, Vol. 58, p. 561 (1985).

Experimental 1C is a cord treated with a tetrafluoromethane/oxygen plasma for 2.5 minutes followed by an ammonia plasma for 2.5 minutes.

Experimental 1D is a cord treated with a tetrafluoromethane/oxygen plasma for 2.5 minutes followed by an oxygen plasma for 2.5 minutes.

Experimental 1E is a cord treated with a tetrafluoromethane/oxygen plasma for 2.5 minutes followed by a nitrous oxide plasma for 2.5 minutes.

Experimental 1F is a cord treated with a tetrafluoromethane/oxygen plasma for 2.5 minutes followed by an air plasma for 2.5 minutes.

After the plasma treatment, all the experimental cords in this example were dipped in RFL adhesive only and tested for adhesion to natural rubber compound.

TABLE I

| Experimental | Plasma Gas | Peel Force N/cm |
|---|---|---|
| Control 1A | | 205 |
| Control 1B | | 289 |
| 1C | Ammonia | 369 |
| 1D | Oxygen | 360 |
| 1E | Nitrous Oxide | 382 |
| 1F | Air | 360 |

The cured composite adhesion was determined by a hot 2-ply t-peel test similar to the ASTM D1876 wherein a laminate of adhesive dipped cord and test rubber is peeled apart and the force required to do so is recorded. Under this test, higher values represent a stronger bond. Accordingly, the plasma prepared test cords are considered better than the control samples. Differences of +/−10% may be taken as meaningful.

EXAMPLE 2

This example illustrates the effect of air/water plasma treatment following a $CF_4/O_2$ pretreatment, showing the effectiveness of a two-step approach. The Peel Force test was conducted as described in Example 1.

Experimental 2A is a cord treated with a tetrafluoromethane/oxygen plasma. Experimental 2B is a cord treated with a tetrafluoromethane/oxygen plasma followed by an air/water plasma. Experimental 2C is a cord treated with an air/water plasma.

After the plasma treatment, the cords in this example were dipped in RFL adhesive only and tested for adhesion to natural rubber compound. The rubber compound used in this and the following examples is compound 7A (Table VII) unless otherwise specified.

TABLE II

| Experiment | Plasma Gas | Peel Force N/cm |
|---|---|---|
| 2A | $CF_4/O_2$ | 335 |
| 2B | $CF_4/O_2$ + $Air/H_2O$ | 378 |
| 2C | $Air/H_2O$ | 269 |

EXAMPLE 3

In this example, PET (polyethylene terephthalate) film samples were laminated between two layers of rubber stock (natural rubber), the rubber was cured, and the composite was tested for adhesion of the rubber to the PET film.

This example illustrates the adhesion obtained by using $CF_4/O_2$ pre-treatment prior to carbon disulfide ($CS_2$) deposition. The pre-treatment appears to cause plasma deposited $CS_2$ to bond more effectively to a substrate PET film. In this and in the following examples, the exposure to the $CS_2$ plasma was two minutes. The result is not readily visible in the force data but is seen from the rubber coverage values which indicates that the location of the failure zone is in the rubber instead of at the bonding interface between the rubber and the PET (polyethylene terephthalate). The only parameter varied in this example is the time of exposure to the $CF_4/O_2$ plasma.

Experimental 3A is a PET film (4 mil clear polyethylene terephthalate from Transilwrap Co., Cleveland) as received from the supplier which was treated with a $CS_2$ plasma for 2 minutes. Experimental 3B is a PET film which was treated with $CF_4/O_2$ plasma for 15 seconds followed by treatment with a $CS_2$ plasma for 2 minutes. Experimental 3C is a PET film treated with $CF_4/O_2$ plasma for 30 seconds and a $CS_2$ plasma for 2 minutes. Experimental 3D is PET film treated with $CF_4/O_2$ plasma for 60 seconds and a $CS_2$ plasma for 2 minutes. Experimental 3E is a PET film treated with $CF_4/O_2$ plasma for 120 seconds and a $CS_2$ plasma for 2 minutes.

TABLE III

| Experiment | Pre-Treat Time (s) | Peel Force (N/cm) | Rubber Coverage (%) |
|---|---|---|---|
| 3A | 0 | 202 | 60 |
| 3B | 15 | 192 | 70 |
| 3C | 30 | 215 | 100 |
| 3D | 60 | 229 | 100 |
| 3E | 120 | 219 | 100 |

The cured composite adhesion was determined by a 1-ply t-peel test similar to the ASTM D1876 procedure wherein a laminate of treated film and test rubber compound is peeled apart and the force to do so recorded. Under this test, higher values represent a stronger bond and are considered better than the control sample value of 1. The variation of the test is such that differences of greater than +/−10% may be taken as meaningful.

The rubber tear factor was determined by visually estimating the relative proportion of the peeled zone (see 2 above) where the failure was in the rubber component, i.e. rubber remained on the film surface after tearing. Under this test higher values indicate cohesive failure of the rubber rather than failure of the cord/rubber interface. The control value was 60%. The maximum attainable value is 100% rubber tear.

EXAMPLE 4

It is apparent that optimum cleaning is obtained on exposure to $CF_4/O_2$ plasma for 30 seconds. Accordingly, in the following examples, unless otherwise specified, exposure to the cleaning (i.e. non-incorporating) plasma is 30 seconds.

For the purpose of this and following examples, polyester film is the experimental plasma substrate used. The film has the same chemical and basic physical properties as tire cord polyester; however, its form facilitates easier testing and demonstration of the concepts described herein.

Polyester film was plasma treated with a mixture of air and water followed by a plasma of carbon disulfide. Plasma treated films were laminated between two sheets of rubber and tested for adhesion. The representative samples were Control 4A (not treated in any way), Experimental 4B for air/water plasma-treated, and Experimental 4C for carbon disulfide plasma-treated ($CS_2$).

TABLE IV

| | Relative Adhesive Properties (1) | |
|---|---|---|
| Treatment | Relative Adhesion (2) | Rubber Tear (3), % |
| Control 4A (none) | 1 | 0 |
| 4B (air/water) (4) | 308 | 0 |
| 4C ($CS_2$) (5) | 13,308 | 100 |

1. Adhesion results are normalized to those of Control 4A which is assigned a value of 1.
2. The cured composite adhesion was determined by a 1-ply t-peel test similar to the ASTM D1876 procedure wherein a laminate of treated film and test rubber compound is peeled apart and the force to do so recorded. Under this test, higher values represent a stronger bond and are thus, for the purposes of this invention, considered better than the control sample value of 1. The variation of the test is such that differences of greater than +/−10% may be taken as meaningful.
3. The rubber tear factor was determined by visually estimating the relative proportion of the peeled zone (see 2 above) where the failure was in the rubber component, i.e. rubber remained on the film surface after tearing. Under this test higher values indicate cohesive failure and are considered better than the control value of 0%. The maximum attainable value is 100% rubber tear.
4. The air/water plasma was applied by plasma reaction of a mixture of air and water using an RF (radio-frequency of 13.56 MHz) generated plasma of air and water gases in a vacuum chamber (less than 1 torr of mercury), onto the surface of 2 mil polyester film.
5. The carbon disulfide plasma was applied by plasma reaction of carbon disulfide using an RF (radio-frequency of 13.56 MHz) generated plasma of carbon disulfide vapor in a vacuum chamber (less than 1 torr of mercury), onto the surface 2 mil polyester film previously treated by an air/water plasma.

Thus, adhesion of the rubber composite is significantly increased without the use of a conventional adhesive such as an RFL or epoxy/RFL adhesive.

EXAMPLE 5

Polyester film was plasma treated with a mixture of air and water followed by a plasma of carbon disulfide. Plasma treated films were tested by laminating between two sheets of rubber and tested for adhesion (Table V).

The representative samples were Control 5A, which was plasma treated but not aged; Experimental 5B for a sample exposed to 1 day humid aging after plasma treatment; Experimental 5C for a sample exposed to 2 days humid aging; and Experimental 5D for a sample exposed to 8 days humid aging.

TABLE V

Humid Aged Adhesion of Plasma-Treated Films (1)

| Treatment | Adhesion (2) (N/cm) | Rubber Tear (3), % |
|---|---|---|
| Control 5A (4) | 190 | 100 |
| 5B (1 Day) (5) | 154 | 100 |
| 5C (2 Days) (6) | 164 | 100 |
| 5D (8 Days) (7) | 166 | 100 |

1. Aging was by exposure to air at 98% Relative Humidity and 100° F.
2. Data was obtained as described in Example 4.
3. Data was obtained as described in Example 4.
4. The carbon disulfide plasma was applied using an RF (radio-frequency of 13.56 MHz) generated plasma of carbon disulfide vapor in a vacuum chamber (less than 1 torr of mercury), onto the surface of a 2 mil polyester film previously treated by an air/water plasma.
5. Sample was prepared in the same manner as the control and exposed to humid aging for 1 day.
6. Sample was prepared in the same manner as the control and exposed to humid aging for 2 days.
7. Sample was prepared in the same manner as the control and exposed to humid aging for 8 days.

Thus, plasma adhesive is not affected by exposure to humid atmospheres for up to 8 days.

EXAMPLE 6

Polyester film was plasma treated with a mixture of air and water followed by a plasma of carbon disulfide. Plasma treated films were laminated between two sheets of rubber and tested for adhesion. (Compare with Example 3.) The representative samples were Control 6A plasma treated and tested at room temperature and Experimental 6B for the same material tested at 200° F.

TABLE VI

Relative Adhesion (1) at Different Temperatures

| Treatment | Adhesion (2) (N/cm) | Rubber Tear (3), % |
|---|---|---|
| Control 6A (4) | 144 | 100 |
| 6B (200° F.) (5) | 130 | 100 |

1. Heating was in circulating air at 200° F.
2. Data was obtained as described in Example 4.
3. Data was obtained as described in Example 4.
4. The carbon disulfide plasma was applied using an RF (radio-frequency of 13.56 MHz) generated plasma of carbon disulfide vapor in a vacuum chamber (less than 1 torr of mercury), onto the surface of a 2 mil polyester film previously treated by an air/water plasma.
5. The sample was prepared exactly as for 4 above but tested hot.

Thus plasma treatment adhesion is not degraded by exposure to heat.

EXAMPLE 7

Polyester film was plasma treated with a mixture of air and water followed by a plasma of carbon disulfide. Plasma treated films were tested by laminating between two sheets of rubber and tested for adhesion in composites using five different natural rubber formulas (Table VII) and tested for adhesion (Table VIII).

TABLE VII

Rubber Compound Formulas

| Component | Cmpd 7A | Cmpd 7B | Cmpd 7C | Cmpd 7D | Cmpd 7E |
|---|---|---|---|---|---|
| Natural rubber | 100 | 100 | 53 | 50 | 100 |
| Synthetic rubber (SBR) | 0 | 0 | 47 | 50 | 0 |
| Carbon black | 57 | 57 | 60 | 57 | 57 |
| Silica | 10 | 10 | 12 | 10 | 10 |
| Stearic acid | 2 | 2 | 2 | 0 | 0 |
| Antioxidant | 1.75 | 1.75 | 0.75 | 1 | 1 |
| Plasticizer | 0.05 | 0.05 | 0.05 | 0 | 0 |
| Resins | 9 | 2 | 6 | 9 | 9 |
| Processing oil | 2 | 2 | 11 | 4 | 4 |
| Wire Adhesion promoter | 1 | 1 | 0 | 0 | 0 |
| Zinc oxide | 8 | 8 | 12 | 8 | 8 |
| Cure accelerator | 0.95 | 1.05 | 1 | 0.75 | 0.75 |
| Sulfur | 4 | 5 | 4 | 5 | 2.5 |

TABLE VIII

Relative Adhesion

| Treatment | Adhesion (1) (N/cm) | Rubber Tear (2), % |
|---|---|---|
| Compound 7A | 190.0 | 100 |
| Compound 7B | 203.0 | 100 |
| Compound 7C | 183.0 | 100 |
| Compound 7D | 217.0 | 100 |
| Compound 7E | 254.0 | 100 |

1. Data were obtained as described in Example 4.
2. Data were obtained as described in Example 4.

The carbon disulfide plasma was applied using an RF (radio-frequency of 13.56 MHz) generated plasma of carbon disulfide vapor in a vacuum chamber (less than 1 torr of mercury), onto the surface of a 2 mil polyester film previously treated by an air/water plasma.

Thus, composite adhesion between plasma modified polyester film and rubber compounds made with different resin, sulfur and rubber contents is increased regardless of the differences between the rubber compounds.

EXAMPLE 8

Three thousand denier aramid yarn was twisted into plies and 3 such plies were used to make a cord (3000/3) which was treated in a continuous process by exposure to a tetrafluoromethane/oxygen plasma followed by exposure to a plasma of carbon disulfide. Plasma treated cords were tested by curing in rubber, and adhesion between the cords and the rubber was measured using a pull-out force method. The representative samples are Control 8A for a cord with a spin finish dipped with a regular epoxy/RFL type adhesive, Experimental 8B for cords with spin finish treated with carbon disulfide plasma; Experimental 8C for cords without spin finish, treated with carbon disulfide plasma; and Experimental 8D for cords without spin finish which were heated with an infrared lamp followed by carbon disulfide plasma treatment. Spin finish is a processing aid applied by the cord manufacturer which makes it possible for the manufacturer to spin, twist, cable and weave the reinforcing polymer without damage.

TABLE IX

Relative Adhesion of Plasma Treated Tire Cords (1)

| Treatment | Adhesion (1) (N) |
|---|---|
| Control 8A (2) | 277 +/− 3.0 |
| 8B (3) | 286 +/− 3.0 |
| 8C (4) | 288 +/− 1.0 |

TABLE IX-continued

Relative Adhesion of Plasma Treated Tire Cords (1)

| Treatment | Adhesion (1) (N) |
|---|---|
| 8D (5) | 314 +/− 10.0 |

1. Adhesion measurements were made by embedding the treated cords in a layer of rubber compound and determining the force required to remove the cord. The variation of the test is such that differences of +/− 5% may by taken as meaningful.
2. Control 8A is an untreated aramid cord with a spin finish dipped in an aqueous epoxy solution and then dried and cured followed by dipping in an RFL water dispersion and then again dried and cured, which is the present method for treating Aramid tire reinforcements.
3. The spin finish was a commercial formulation applied by the aramid supplier to improve handling of the cord and reduce internal filament friction. The carbon disulfide plasma was applied using an RF (radio-frequency of 13.56 MHz) generated plasma of carbon disulfide vapor in a vacuum chamber (less than 1 torr of mercury), onto the surface of aramid cords previously treated by a tetrafluoromethane/oxygen plasma.
4. Finish-free cords are the same basic material but without applied spin-finish. The carbon disulfide plasma was applied using an RF (radio-frequency of 13.56 MHz) generated plasma of carbon disulfide vapor in a vacuum chamber (less than 1 torr of mercury), onto the surface of aramid cords previously plasma treated by a tetrafluoromethane/oxygen plasma.
5. Heating was by means of heat-lamp exposure immediately before entry into the vacuum system of the plasma treatment chamber to accelerate the removal of water vapor from the cords. The carbon disulfide plasma was applied using an RF (radio-frequency of 13.56 MHz) generated plasma of carbon disulfide vapor in a vacuum chamber (less than 1 torr of mercury), onto the surface of aramid cords previously treated by a tetrafluoromethane/oxygen plasma.

This example illustrates that plasma deposited carbon disulfide promotes adhesion when applied to a reinforcing cord surface, and such adhesion can be enhanced by heating the cord prior to treatment.

EXAMPLE 9

Short fiber reinforcements in the form of chopped polyester filament were treated by exposure to a tetrafluoromethane/oxygen plasma followed by treatment with a carbon disulfide plasma. The fibers were mixed in rubber, calendered to orient the fibers in a single direction and cured into test pieces. Testing was by measurement of the dynamic physical properties of the composite along the direction of the fibers. The representative samples are Control 9A for a compound formulated without short fibers; Experimental 9B for rubber with untreated short fibers loaded at 5 parts per 100 parts base rubber (phr), Experimental 9C for rubber with untreated short fibers loaded at 8 (phr); Experimental 9D for rubber with short fibers treated with a tetrafluoromethane/oxygen plasma mixture followed by carbon disulfide plasma treatment, loaded at 5 (phr); and Experimental 9E for rubber with short fibers treated with tetrafluoromethane/oxygen plasma mixture followed by carbon disulfide plasma treatment, loaded at 8 phr.

TABLE X

Dynamic Mechanical Properties of Plasma Treated Short Fibers (1)

| Treatment | Energy Density at 30% Strain (2) |
|---|---|
| Control 9A (2) | 100 |
| 9B | 130 |
| 9C | 140 |
| 9D | 163 |
| 9E | 205 |

1. Measurements were made on a sample molded into a special geometry and cycled at 1 Hz at progressively increasing strains. Dynamic properties of the composite were thus measured.
2. The region 25–35% strain is critical for fiber loaded composites since this is where rubber to fiber bonding tends to break down. A measure of the strength of this bonding interaction then is the stored energy density at a selected strain. For the purposes of this example, the value for the control rubber without fibers was assigned the value 100, and greater numbers are considered relatively better.

Thus, the plasma treatment increases the bonding of the short fiber to the rubber as indicated by the strain energy density at debond for samples with the same fiber loading.

While specific embodiments of the invention have been illustrated and described, those skilled in the art will recognize that the invention may be variously modified and practiced without departing from the spirit of the invention. The invention is limited only by the following claims.

What is claimed is:

1. A reinforcement material for an elastomer, said reinforcement material comprising a filament, tow, woven fabric, cord or fiber, said reinforcement material further comprising a polymer selected from the group consisting of carbon fiber, polyether, cellulose, polyurea, polyolefin, polyester, polyurethane, polyamide, polyvinyl alcohol, and polyphenylene sulfides, and mixtures thereof wherein a surface of said material has thereon deposited polymer species which are reactive with an elastomer in which it is used, said deposited polymer species being formed using electrical energy in the 50 Hz (ac) to 2.45 GHz range by ionization of polymerizing gases selected from the group consisting of sulfides, thiols and isocyanates containing 1–15 carbon atoms.

2. The reinforcement material of claim 1 wherein said deposited polymer species are formed from carbon disulfide.

3. The reinforcement material of claim 1 wherein a polymerizing gas plasma is produced at 20°–50° C. at a pressure of 0.001 to 1.0 torr.

* * * * *